US007190685B2

(12) United States Patent
Das et al.

(10) Patent No.: US 7,190,685 B2
(45) Date of Patent: Mar. 13, 2007

(54) CONTROL INFORMATION TRANSMISSION IN A WIRELESS COMMUNICATION SYSTEM

(75) Inventors: Arnab Das, Old Bridge, NJ (US); Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 697 days.

(21) Appl. No.: 09/779,111

(22) Filed: Feb. 8, 2001

(65) Prior Publication Data

US 2002/0105960 A1 Aug. 8, 2002

(51) Int. Cl.
*H04J 3/00* (2006.01)
*H04J 3/24* (2006.01)

(52) U.S. Cl. ...................... 370/336; 370/349; 370/474; 370/476

(58) Field of Classification Search ................ 370/347, 370/336, 337, 341, 342, 345, 349, 468, 474, 370/476, 478, 458, 442, 475; 455/451, 464
See application file for complete search history.

(56) References Cited

U.S. PATENT DOCUMENTS 5,206,858 A * 4/1993 Nakano et al. ............. 370/465
5,347,513 A * 9/1994 Abefelt et al. .............. 370/381
5,507,018 A * 4/1996 Seppala ................... 455/127.1
5,539,732 A * 7/1996 Schyman et al. ........... 370/377
5,544,156 A * 8/1996 Teder et al. ................ 370/342
5,677,918 A * 10/1997 Tran et al. .................. 714/748
5,729,541 A * 3/1998 Hamalainen et al. ....... 370/337
5,732,073 A * 3/1998 Kusaki et al. .............. 370/280
5,732,353 A * 3/1998 Haartsen ..................... 455/450
5,742,592 A * 4/1998 Scholefield et al. ........ 370/329
5,931,964 A * 8/1999 Beming et al. ............. 714/748
6,028,854 A * 2/2000 Raith et al. ................. 370/347
6,084,911 A * 7/2000 Ishikawa .................... 375/240
6,434,130 B1 * 8/2002 Soininen et al. ............ 370/331
6,466,568 B1 * 10/2002 Raith et al. ................. 370/347
6,529,492 B1 * 3/2003 Miya .......................... 370/335
6,529,525 B1 * 3/2003 Pecen et al. ................ 370/469
6,532,364 B1 * 3/2003 Uchida et al. .............. 455/436
6,577,619 B2 * 6/2003 Savuoja ...................... 370/349
6,601,209 B1 * 7/2003 Lewis et al. ................ 714/756
6,603,978 B1 * 8/2003 Carlsson et al. ............ 455/502
6,611,509 B1 * 8/2003 Hayashi et al. ............. 370/335
6,631,116 B1 * 10/2003 Eneroth et al. .......... 370/236.2
6,671,269 B1 * 12/2003 Ueno et al. ................. 370/345
6,693,879 B1 * 2/2004 Kawamura et al. ......... 370/475
6,721,299 B1 * 4/2004 Song .......................... 370/342
6,738,634 B1 * 5/2004 Shin ........................... 455/466
6,744,746 B1 * 6/2004 Bartelme .................... 370/329
6,744,788 B2 * 6/2004 Eastty ........................ 370/509
2002/0013135 A1 * 1/2002 Proctor ....................... 455/228
2002/0015405 A1 * 2/2002 Sepponen et al. .......... 370/389
2002/0126710 A1 * 9/2002 Bergenwall et al. ........ 370/535
2004/0082357 A1 * 4/2004 Moulsley et al. ........... 455/522

* cited by examiner

*Primary Examiner*—Doris H. To
*Assistant Examiner*—Ian N. Moore

(57) ABSTRACT

Disclosed is a method and apparatus of data transmission having increased reliability in control information transmission without increased overhead and frame transmission delays. This method and apparatus of data transmission involves transmitting a data packet over a plurality of time slots of a data channel and associated control information over a plurality of time slots of a parallel control channel, wherein the control information in each time slot indicates to a receiver a manner of decoding the data packet or a portion of the data packet which was transmitted in a corresponding time slot of the data channel.

33 Claims, 3 Drawing Sheets

CONTROL INFORMATION TRANSMISSION IN A WIRELESS COMMUNICATION SYSTEM

FIELD OF THE INVENTION

The present invention relates generally to communication systems and, in particular, to control information transmission for wireless communication systems.

BACKGROUND OF THE RELATED ART

Data transmission in communication systems involve transmitting data packets and control information, wherein the control information indicates a manner of decoding the data packets. In wireless communication systems, the data packets and control information are channel coded to compensate for errors arising in their transmission to a receiver. The control information can be transmitted over a same communication channel with the data packet as a header or over a different communication channel parallel to the communication channel of the data packet transmission. Regardless of the manner in which the control information is transmitted, the data packet cannot be successfully decoded at the receiver if the control information cannot successfully decoded at the receiver.

Current proposals for data transmissions in wireless communication systems utilize a form of Automatic Retransmission Request (ARQ) referred to as Hybrid ARQ. In Hybrid ARQ, errors in data packet transmissions can be corrected using a technique known as Incremental Redundancy (IR), which involves combining two or more transmissions of the same data packet. IR, however, cannot be used to correct errors in control information transmissions because a separate control channel for the control channel would be needed. Thus, it is important that the control information be successfully decoded on each transmission attempt otherwise the data packet transmissions cannot be successfully decoded at the receiver.

One proposal for increasing the reliability of control information transmissions involves utilizing stronger channel coding. See FIG. 7, which depicts an example 70 utilizing stronger channel coding on the control information. In example 70, control information is transmitted as a packet header with the data over a same communication channel. The control information is channel coded at a rate of ¼, whereas the data is channel coded at a rate of ½. Thus, the control information is channel coded at twice the rate of the data packet, which increases the likelihood that the control information can be successfully decoded at the receiver. This proposal for utilizing stronger channel coding on the control information increases overhead, which is undesirable in wireless communication systems.

Another proposal for increasing the reliability of the control information transmission involves transmitting the control information on a parallel channel to the data packet transmission thereby allowing the control information transmission to be controlled independently of the data packet transmission to increase its reliability. FIG. 8 depicts an example 80 illustrating control information being transmitted over a parallel channel, wherein the channel over which the control information is transmitted is independently power controlled to increase the reliability of the control information transmission. In example 80, the control information and data packet transmissions both span a duration equivalent to a frame. In order to decode the data packet transmission, the receiver would need to wait at least the whole duration of the frame to receive and successfully decode the entire control information transmission. This proposal is undesirable because it would cause an increase in frame transmission delays when the control information transmission cannot be successfully decoded.

Accordingly, there exists a need for a method and apparatus of data transmission in which the reliability of control information transmission can be increased without increased overhead and frame transmission delays.

SUMMARY OF THE INVENTION

The present invention is a method and apparatus of data transmission having increased reliability in control information transmission without increased overhead and frame transmission delays. The present invention involves transmitting a data packet over a plurality of time slots of a data channel and associated control information over a plurality of time slots of a parallel control channel, wherein the control information in each time slot indicates to a receiver a manner of decoding the data packet or a portion of the data packet which was transmitted in a corresponding time slot of the data channel.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a method and apparatus of data transmission having increased reliability in control information transmission without increased overhead and frame transmission delays. The present invention involves transmitting a data packet over a plurality of time slots of a communication channel (hereinafter referred to as a "data channel") and associated control information over a plurality of time slots of a parallel communication channel (hereinafter referred to as a "control channel"), wherein the control information in each time slot indicates to a receiver a manner of decoding the data packet or a portion of the data packet which was transmitted in a corresponding time slot of the data channel.

Figure 1:
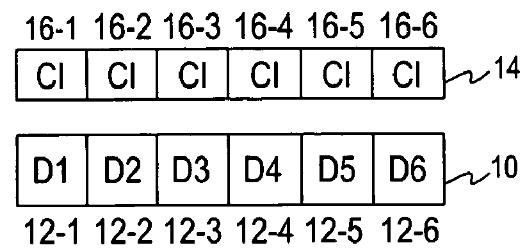
FIG. 1 depicts an example illustrating transmission of a data packet and associated control information in accordance with the present invention.

FIG. 1 transmission of a data packet 10 and associated control information 14 in accordance with one embodiment of the present invention. Preferably, both data packet 10 and control information 14 are channel coded prior to transmission for purposes of enhancing error compensation at the receiver. Data packet 10 is divided into a plurality of data sub-packets 12-n, where n≧1. Note that data packet 10 could either be channel coded data or plain data. In the latter case, the data sub-packets would need to. be channel coded prior to transmission. Each of the data sub-packets 12-n are transmitted over separate time slots n of the data channel. In an alternate embodiment, data sub-packets 12-n may be transmitted over time slots belonging to two or more different communication channels.

Control information 14 includes information on how to decode the associated channel coded data packet 10. Control information 14 may also include a user identifier for indicating a user to whom data packet 10 is intended and a packet size indicator for indicating a number of sub-packets associated with data packet 10. Control information 14 is transmitted as control information 16-n over time slots n of the control channel. The control channel being parallel to the data channel, and the time slots of the control channel being time synchronized to the time slots of the data channel such that time slot n of the control channel spans the same time interval as time slot n of the data channel. In one embodiment, each transmission of control information 16-n is identical to each other. That is, the same control information is repeated in each time slot n of the control channel and can be used to decode data packet 10 or any data sub-packet 12-n. In an alternate embodiment, if data sub-packets 12-n were channel coded using more than one channel coding technique, then each control information 16-n would indicate a manner of decoding its associated data sub-packet 12-n. Advantageously, in either embodiment, a receiver can start decoding a data packet before the entire data packet is received. Specifically, if control information 16-n is successfully decoded from the received control information transmissions, then the receiver can start to decode data sub-packets 12-n. Thus, frame transmission delays are minimized because the receiver does not have to wait to receive the entire data packet 10 before it can start decoding data packet 10 or data sub-packets 12-n.

As described above, control information 16-n transmitted in time slots n of the control channel indicates a manner of decoding data sub-packets 12-n (or data packet 10) transmitted in time slots n of the data channel. Thus, control information 16-n and data sub-packets 12-n are transmitted in a synchronized manner such that the receiver would know to associate which control information 16-n to which data sub-packet 12-n. It should be understood that the time slots of the control channel over which control information 16-n are transmitted do not have to correspond to the same time slots of the data channel over which data sub-packets 12-n are transmitted. All that is necessary is that the receiver knows which control information 16-n to use to decode data sub-packet 12-n. Preferably, control information 16-n is transmitted before or at the same time as its associated data sub-packet 12-n.

In an embodiment of the present invention, data sub-packets 12-n are transmitted over time slots n of the data channel and control information 16-n is transmitted over time slots n-y of the control channel, where y is an integer. Thus, a receiver receiving control information 16-n transmitted over time slot n-y of the control channel would know to associate control information 16-n with data sub-packets 12-n transmitted over time slot n of the data channel. Alternately, control information 16-n and/or data sub-packets 12-n could include an indication of the data sub-packet and/or control information to which they are associated. For example, control information 16-n includes an indication that the data sub-packet 12-n transmitted in time slot z of the data channel is its associated data sub-packet.

Since control information 14 is being transmitted over a control channel instead of the data channel, overhead is minimized and power control techniques can be utilized to increase the likelihood that control information 14 (or 16-n) will be received by the receiver with no or less errors. In one embodiment, the control channel is power controlled using channel quality feedback received from the receiver.

Figure 2:
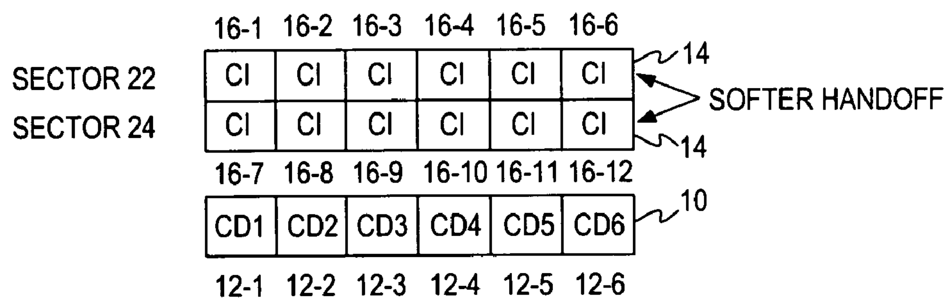
FIG. 2 depicts an example illustrating a manner of transmitting control information in softer handoff situations.

Transmitting control information 14 on a communication channel independent of the data channel also allows for increased reliability of control information transmissions in handoff situations; particularly in softer and, perhaps, in soft handoff situations. Specifically, in handoff situations, control information 14 may be transmitted over two or more control channels. FIG. 2 depicts an example 20 illustrating a manner of transmitting control information 14 in softer handoff situations, wherein softer handoff describes a situation in which a mobile-telephone or receiver is handed-off from a primary sector to a secondary sector of a same cell. As shown in FIG. 2, control information 16-n is transmitted in time slot n of a control channel belonging to the primary sector 22 and in time slot n of a control channel belonging to the secondary sector 24, wherein time slots of both control channels are preferably synchronized to each other and the control information transmitted over both control channels are identical. Upon receiving both of the control information transmissions, the mobile-telephone can combine the two received transmissions to obtain control information 14.

The data transmission method and apparatus of the present invention can be incorporated into communication systems in which data transmissions to users are time multiplexed. In one embodiment, control information 14 would include the user identifier to indicate the user to whom data packet 10 is intended. Additionally, a sequence identifier or a new/continuation flag would also be transmitted as part of control information 14 or separate from control information 14 over a parallel communication channel, wherein a sequence identifier indicates the sequence of an associated data sub-packet 12-n (e.g., sequence identifier indicates the associated data sub-packet is the fourth data sub-packet out of eight total data sub-packets) and a new/continuation flag indicates whether the associated data sub-packet 12-n is the beginning of a new data packet transmission or the continuation of a data packet transmission in progress.

Figure 3:
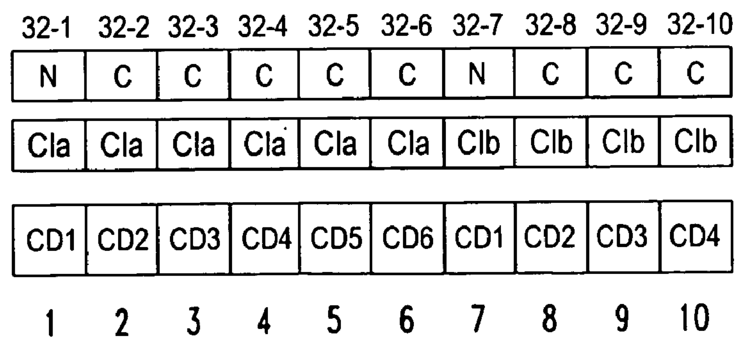
FIG. 3 depicts an example illustrating a communication systems in which data transmissions to users are time multiplexed.

FIG. 3 depicts an example 30 illustrating a communication systems in which data transmissions to users are time multiplexed. In example 30, control information 14 includes user identifiers, and new/continuation flags 32-n are transmitted over time slots n of a new/continue channel, which is a parallel channel to the control and data channels. Specifically, a data packet for user A is transmitted over the data channel in time slots 1–6, control information having a user identifier indicating user A is transmitted over the control channel in time slots 1–6, a new flag is transmitted over the new/continue channel in time slot 1 (to indicate the beginning of a new data packet transmission) and continue flags are transmitted over the new/continue channel in time slots 2–6 (to indicate a continuation of the data packet transmission in progress. After time slot 6, a data packet for user B is transmitted over the data channel in time slots 7–10, control information having a user identifier indicating user B is transmitted over the control channel in time slots 7–10, a new flag is transmitted over the new/continue channel in time slot 7 and continue flags are transmitted over the new/continue channel in time slots 8–10. The new/continue flag being represented by a single bit.

Figure 4:
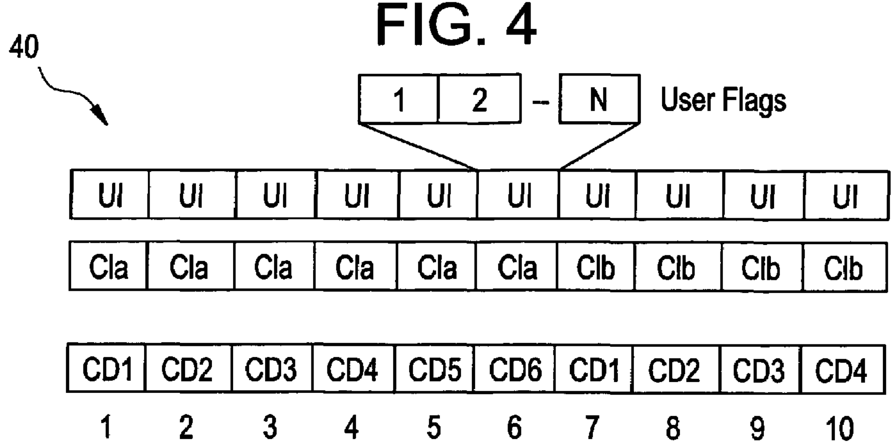
FIG. 4 depicts an example of an embodiment of the present invention in which user specific flags are used to indicate a user to whom associated control information and data packet transmissions are intended.

In another embodiment, control information 14 does not include user identifiers, and user specific flags are used to indicate a user to whom the associated control information and data packet transmissions are intended. User specific flags may be any method of orthogonal signaling. FIG. 4 depicts an example 40 of such an embodiment. In example 40, the user specific flags being transmitted over time slots of a user identity channel, which is a parallel communication channel to the control and data channels. For X data users in the communication system, X user specific flags are transmitted in each time slot n of the user identity channel, wherein each user specific flag is represented by a bit. The relative position of each bit being indicative of the users. For example, the fourth bit or user specific flag represents the fourth user or user D. The user specific flag is set to "1" or turned "on" (i.e., something is transmitted) for the user to whom the associated data packet transmission is intended, whereas the user specific flags are set to "0" or turned "off" (i.e., nothing is transmitted) for all other users. Power control techniques are utilized on the user identity channel to enhance the reliability of that channel. In another embodiment, the user specific flags are replaced with user identifiers which are transmitted over the user identity channel.

All users will examine the bits transmitted over the user identity channel to determine the user(s) to whom the control and data packet transmissions are intended. If a user determines that the control and data packet transmissions are intended for it (i.e., its user specific flag is set to 1), then the user will decode the associated control information and subsequently decode the associated data based on the decoded control information. If a user determines that the control and data packet transmissions are not intended for it (its user specific flag is set to 0), then the user will not attempt to decode the associated control information nor data. Note that the control information would not include a user identifier.

Figure 5:
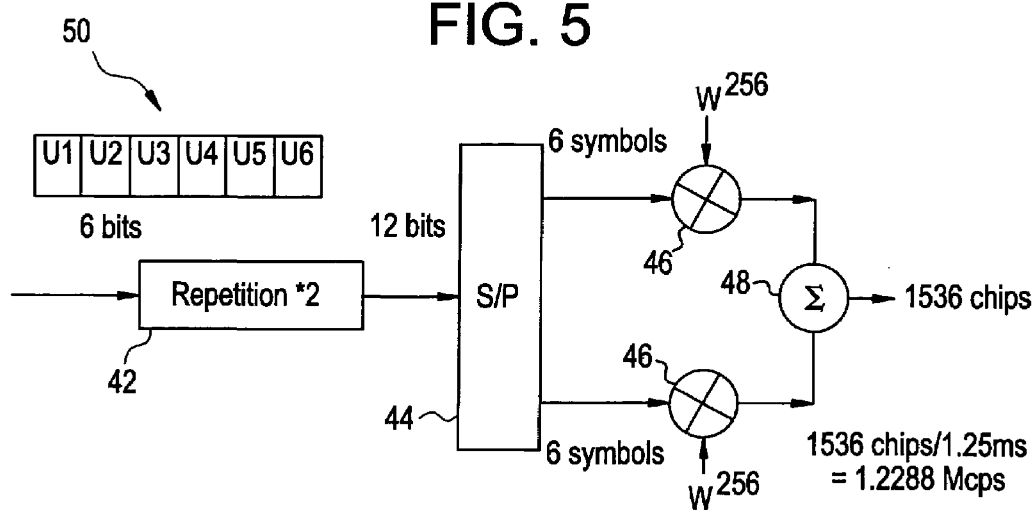
FIG. 5 depicts an example of mapping six user specific flags to 1536 chips in a time slot of a communication channel in a wireless communication system based on the well-known 1x-EV-DV standard.

FIG. 5 depicts an example 50 of mapping six user specific flags to 1536 chips in a time slot of a communication channel in a wireless communication system based on the well-known 1x-EV-DV standard. The bits corresponding to the user specific flags (i.e., U1, U2 . . . ,U6) are first repeated to twelve bits at repeater 42 and then converted to two parallel I and Q (in-phase and quadrature phase) streams at modulator 44 for QPSK (quadrature phase shift keying) modulation comprising of six symbols each. The symbols are then Walsh spread by a 256spreading factor code at multipliers 46 and summed together at summer 48. The 1536 chips after chip level summing from the two branches are transmitted in a single time slot. Note that the repetition factors, Walsh spreading factor are just given as an example. The present invention also applies to cases where the spreading/repetition factors are different or different type of code is used for spreading.

Figure 6:
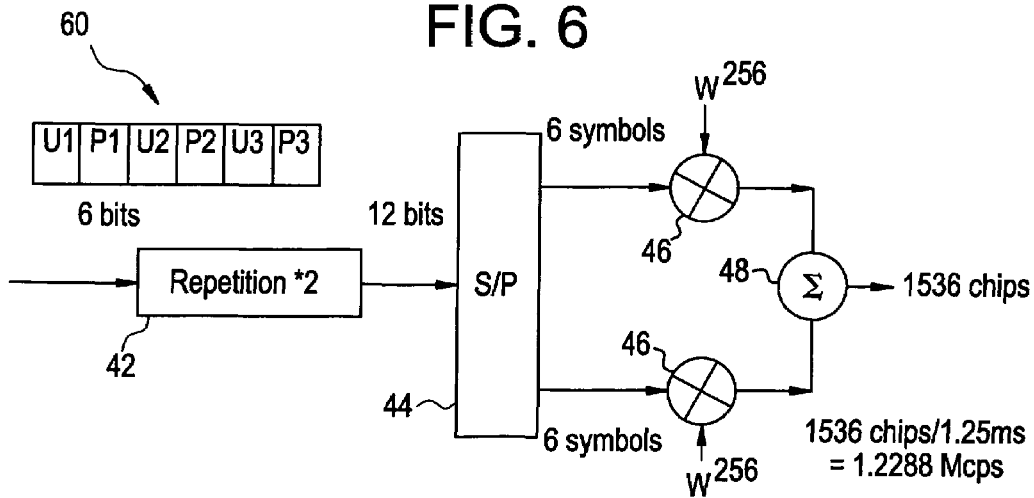
FIG. 6 depicts an example in which three power control bits are transmitted with three user specific flag bits in a time slot of a communication channel in a wireless communication system based on the well-known 1x-EV-DV standard.
Figure 7:
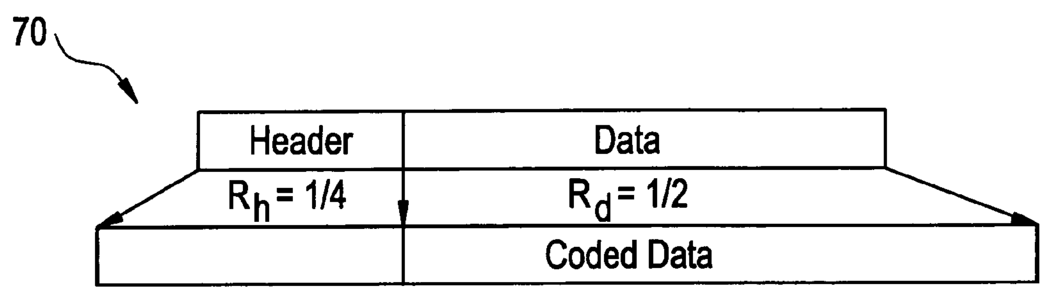
FIG. 7 depicts an example utilizing stronger channel coding on control information than on data packets.
Figure 8:
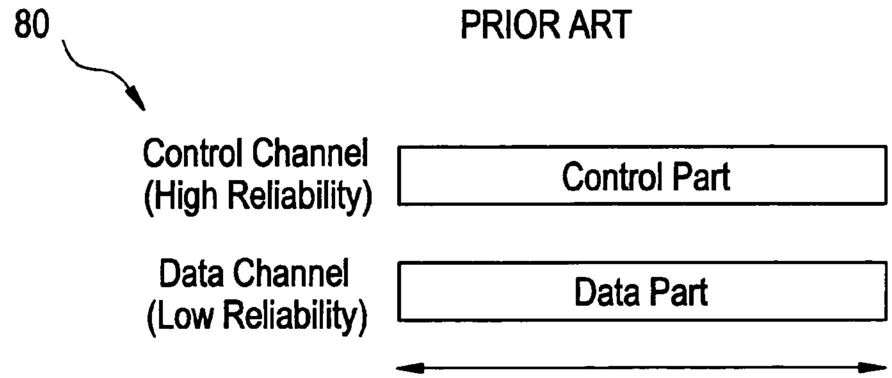
FIG. 8 depicts an example illustrating control information being transmitted over a parallel channel.

In another embodiment, it is possible to transmit the user specific flags with other types of control information, such as reverse link power control bits, over the user identity channel. FIG. 6 depicts an example 60 in which three power control bits (i.e., P1, P2 and P3) are transmitted with three user specific flag bits (i.e., U1, U2 and U3). Note that as a larger number of users need to be supported more codes of the same spreading factor or a different spreading factor can be added for the new users for control information transmission.

In an alternate embodiment, the user specific flags are only turned on or set to one and transmitted when the data packet transmission for a particular user is beginning and when the data packet transmission for that user is completed. Suppose the five data sub-packets are intended for the third user (out of eight users). For the first data sub-packet for the third user, the third user specific flag indicates to the third user that the associated data sub-packet is intended for it and that the associated data sub-packet is the first data sub-packet (e.g., user specific flag for third user is set to one or turned on). For the second through seventh data sub-packet for the third user, the third user specific flag is no different than the user specific flags of the other users (e.g., user specific flag for third user is set to zero or turned off). The third user would know that these data sub-packets are intended for it because of the user specific flag transmitted with the first data sub-packet. For the eighth data sub-packet for the third user, the third user specific flag indicates to the third user that the associated data sub-packet is intended for it and that the associated data sub-packet is the last data sub-packet (e.g., user specific flag for third user is set to one or turned on). Note that there may be different types of user specific flags: one to indicate that the data packet transmission is starting, one to indicate that the data packet transmission is ending and, perhaps, one to indicate that the data packet transmission is in the middle and neither starting nor ending. For example, an in-phase signal may be used to indicate that the data packet transmission is starting, and a quadrature phase signal may be used to indicate that the data packet transmission is ending.

In one embodiment, the present invention is implemented at a base station or transmitter of a wireless communications system for data transmission in the downlink or forward direction. The wireless communication system being based on the well-known 1x-EV-DV standard for third generation CDMA. It should be understood that the present invention may also be implemented at a mobile-telephone or transmitter for data transmission in the uplink or reverse direction, and also applicable to wireless communication systems based on other technologies.

Although the present invention has been described in considerable detail with reference to certain embodiments, other versions are possible. Therefore, the spirit and scope of the present invention should not be limited to the description of the embodiments contained herein.

We claim:

1. A method of data transmission comprising the steps of:

dividing at least a portion of the data packet into a first plurality of different data sub-packets;

associating a first control information with the first plurality of different data sub-packets;

transmitting the same first control information associated with the first plurality of different data sub-packets repeatedly over a plurality of time slots of a control channel; and transmitting the associated first plurality of different data sub-packets over a plurality of time slots of a data channel, the data channel being parallel to the control channel.

2. The method of claim 1, wherein the first control information indicates a manner of decoding the associated first plurality of different data sub-packets.

3. The method of claim 1 comprising the additional step of:

channel coding the data packet prior to the step of dividing the data packet into the first plurality of different data sub-packets.

4. The method of claim 1 comprising the additional step of:

channel coding at least one of the associated first plurality of different data sub-packets prior to the step of transmitting the at least one of the associated first plurality of different data sub-packets.

5. The method of claim 1, wherein the plurality of time slots of the control channel and the plurality of time slots of the data channel are time synchronized to each other.

6. The method of claim 1, wherein the plurality of time slots of the control channel and the plurality of time slots of the data channel are not time synchronized to each other and the first control information includes an indication of the associated first plurality of different data sub-packets.

7. The method of claim 1, wherein the dividing step also includes dividing at least a portion of the data packet into a second plurality of different data sub-packets, and further comprising the additional step of:

associating a second control information with the second plurality of different data sub-packets; transmitting the second control information associated with the second plurality of different data sub-packets over time slots of the control channel; and transmitting the associated second plurality of different data sub-packets over second respective time slots of the data channel.

8. The method of claim 7, wherein the first and second control information are identical.

9. The method of claim 7, wherein the second control information indicates a manner of decoding the associated second plurality of different data sub-packets.

10. The method of claim 1 comprising the additional step of:

transmitting the first control information over a plurality of time slots of another control channel.

11. The method of claim 10, wherein the plurality of time slots of the control channel and the plurality of time slots of the another control channel are time synchronized to each other.

12. The method of claim 1, wherein the first control information includes a new/continuation flag to indicate whether one of the associated first plurality of different data sub-packets is a beginning of a new data packet transmission or a continuation of a data packet transmission in progress.

13. The method of claim 1, wherein the first control information includes a sequence identifier to indicate a sequence of one of the associated first plurality of different data sub-packets.

14. The method of claim 1, wherein the first control information includes a user identifier to indicate a user to whom one of the associated first plurality of different data sub-packets is intended.

15. The method of claim 1, wherein the first control information is channel coded prior transmission.

16. The method of claim 1 comprising the additional step of:

transmitting user specific flags over a time slot of a user identity channel to indicate one or more users to whom one of the associated first plurality of different data sub-packets is intended.

17. The method of claim 1, wherein user specific flags associated with users to whom one of the associated first plurality of different data sub-packets are intended are set to one and user specific flags associated with users to whom the one of the first plurality of different data sub-packets are not intended are set to zero.

18. The method of claim 1, wherein the user specific flags associated with users to whom one of the associated first plurality of different data sub-packets are intended are turned on or set to one and transmitted when the associated one of the plurality of different data sub-packets is a first data sub-packet or a last sub-packet of the data packet.

19. The method of claim 18, wherein the user specific flag is an in-phase signal when one of the associated first plurality of different data sub-packets is the first data sub-packet and a quadrature signal when one of the associated first plurality of different data sub-packets is the last sub-packet of data packet.

20. The method of claim 1, wherein the control channel is power controlled.

21. The method of claim 20 comprising the additional step of:

receiving control channel quality feedback from a receiver to which the data packet is intended.

22. A transmitter comprising of:

means for dividing at least a portion of a data packet into a first plurality of different data sub-packets;

means for transmitting a same first control information associated with the first plurality of different data sub-packets repeatedly over a plurality of time slots of a control channel; and means for transmitting the associated first plurality of different data sub-packets over a plurality of time slots of a data channel, the data channel being parallel to the control channel.

23. The transmitter of claim 22 further comprising of:

means for channel coding the data packet or the first plurality of different data sub-packets.

24. The transmitter of claim 22 further comprising of:

means for transmitting a second control information associated with a second plurality of different data sub-packets over a second plurality of time slots of the control channel; and means for transmitting the associated second plurality of different data sub-packets over a second plurality of time slots of the data channel;

the data channels being separate from the control channel.

25. The transmitter of claim 24, wherein the first and second control information are identical.

26. The transmitter of claim 22 further comprising of:

means for transmitting a new/continuation flag in a time slot q of a new/continue channel to indicate whether one of the associated first plurality of different data sub-packets is a beginning of a new data packet transmission or a continuation of a data packet transmission in progress.

27. The transmitter of claim 22 further comprising of:

means for transmitting a sequence identifier in a time slot of a communication channel parallel to the data or control channel to indicate a sequence of one of the associated first plurality of different data sub-packets.

28. The transmitter of claim 22 further comprising of:

means for channel coding the first control information.

29. The transmitter of claim 22 further comprising of:

means for transmitting user specific flags over a time slot of a user identity channel to indicate one or more users to whom one of the associated first plurality of different data sub-packets is intended.

30. The transmitter of claim 22, wherein the transmitter is a base station belonging to a wireless communication system.

31. The transmitter of claim 22 further comprising of:

means of adjusting a power at which the means transmits the first control information over the control channel.

32. The transmitter of claim 31 further comprising of:

means for receiving control channel quality feedback.

33. A method of data transmission comprising the steps of:

dividing a different data packet into a plurality of data sub-packets;

transmitting a first control information associated with one of the plurality of different data sub-packets over at time slot x of a control channel;

transmitting the associated one of the plurality of different data sub-packets over a time slot y of a data channel;

wherein user specific flags associated with users to whom the associated one of the plurality of different data sub-packets are intended are turned on or set to one and transmitted when the associated one of the plurality of different data sub-packets is a first data sub-packet or a last sub-packet of the data packet; and wherein the user specific flag is an in-phase signal when the associated one of the plurality of different data sub-packets is the first data sub-packet and a quadrature signal when the associated one of the plurality of different data sub-packets it the last sub-packet of data packet.

* * * * *